United States Patent [19]

Saito

[11] 4,364,574
[45] Dec. 21, 1982

[54] VEHICLE HEIGHT ADJUSTING APPARATUS

[75] Inventor: Tetsuo Saito, Zama, Japan

[73] Assignee: Tokico Ltd., Kawasaki, Japan

[21] Appl. No.: 197,323

[22] Filed: Oct. 15, 1980

[30] Foreign Application Priority Data

Oct. 19, 1979 [JP] Japan ................................. 54/135001

[51] Int. Cl.³ ............................................. B62D 37/00
[52] U.S. Cl. .................... 280/6 R; 267/64.16; 280/707
[58] Field of Search ............. 280/6 R, 6 H, 707, 708; 267/64.16

[56] References Cited

U.S. PATENT DOCUMENTS 3,836,161  9/1974  Buhl ..................................... 280/6 H
3,917,307  11/1975  Shoebridge ........................ 280/6 H
4,105,216  8/1978  Graham et al. .
4,168,840  9/1979  Graham .
4,185,845  1/1980  Misch ................................. 280/707

Primary Examiner—Joseph F. Peters, Jr.
Assistant Examiner—John A. Carroll
Attorney, Agent, or Firm—Wenderoth, Lind & Ponack

[57] ABSTRACT

A vehicle height adjusting apparatus includes a height detector detecting the height of a vehicle and generating a height signal, a reference signal generator generating a reference height signal, a comparator comparing the height signal with the reference height signal and generating an output signal, and a height adjusting system actuated by the output signal of the comparator for increasing or decreasing the height of the vehicle. The reference signal generator has a height selector switch for selecting one among a plurality of referential heights.

2 Claims, 3 Drawing Figures

VEHICLE HEIGHT ADJUSTING APPARATUS

This invention relates to a vehicle height adjusting apparatus which is particularly adapted for use with a passenger car.

Conventionally, a vehicle height adjusting apparatus has been provided on an automobile to adjust and maintain the height of the automobile e.g., the height of the chasis thereof with respect to the wheel axle to a predetermined referential height and, preferably, the referential height is as low as possible from the viewpoint of a stable running condition of the automobile.

However, the automobile may not necessarily be operated on a flat and paved road, but it may run on rough roads which are not paved yet or under construction. Thus, the referential height in prior art vehicle height adjusting apparatus has been relatively high so that the automobile can be safely operated on a relatively rough road, and this height is not necessarily the most desirable in operating the vehicle on a paved road, and there is a problem that the lower surface of the chasis or related parts may bottom on projecting portions of road when operating the vehicle on an extremely rough road.

The present invention has been made with respect to aforementioned circumstances and the vehicle height adjusting apparatus according to the invention comprises height detecting means detecting the height of the vehicle and generating a height signal, height selecting means selecting one among a plurality of predetermined referential heights of a vehicle and generating a reference signal, comparator means comparing the height signal with the reference signal and generating an output signal, and an adjusting device receiving the output signal of the comparator means and being operative to adjust the height of the vehicle.

Thus, it is possible to suitably select and adjust the height of the vehicle so as to match the conditions of the road.

The invention will now be explained in detail with reference to accompanying drawings exemplifying a preferred embodiment of the invention, in which.

Figure 1:
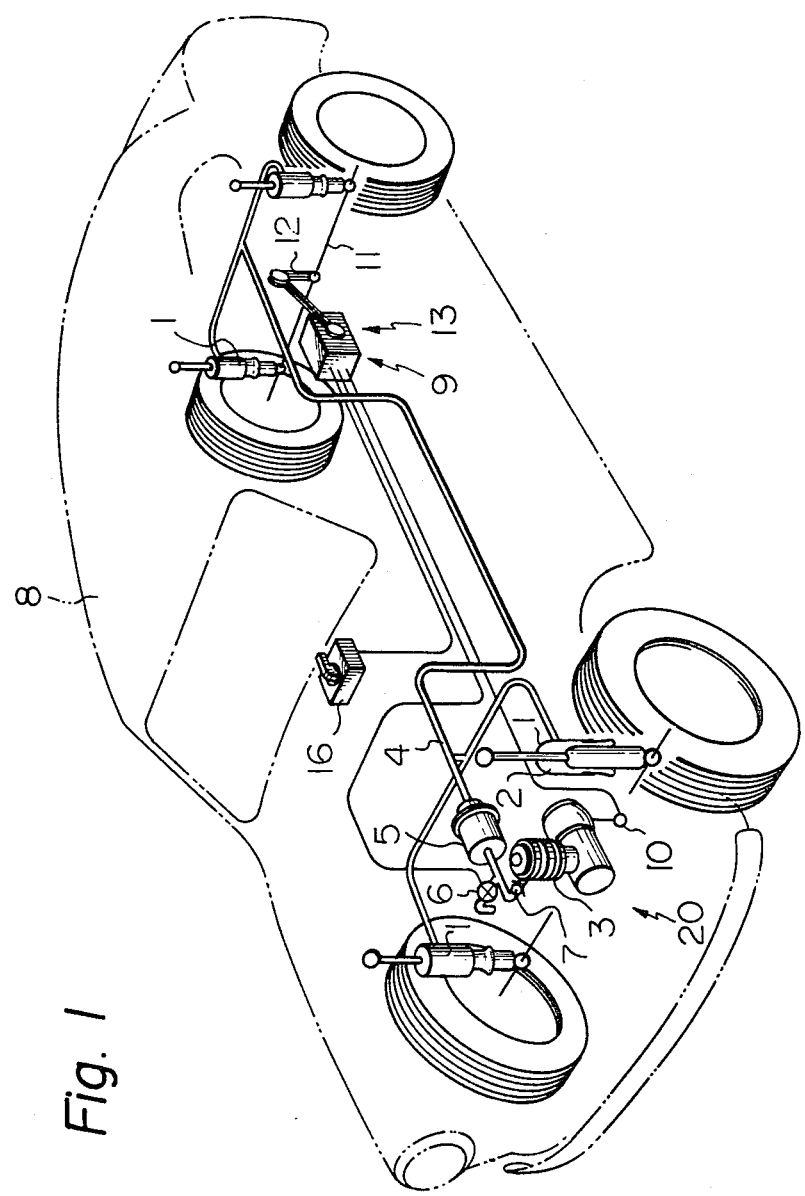
FIG. 1 is a diagrammatic perspective view of a vehicle height adjusting apparatus mounted on a passenger car.

The vehicle height adjusting apparatus shown in the drawings comprises a plurality of device 1 for, inter alia, adjusting the height of the vehicle by supplying or discharging compressed air into or from respective air chambers 2 of the device 1. The devices 1 are of the type known as a combination hydraulic shock absorber and air spring unit which functions also as a shock absorber. For the purposes of this invention their important function is height adjustment and they will be referred to hereinafter simply as height adjusters. In elevating the height of the vehicle an air compressor 3 is operated to supply pressurized air to respective air chambers 2 through a piping 4 which includes a dehumidifying device 5 for removing the humidity from pressurized air produced in the air compressor 3. There is provided a normally closed discharge valve 6. In lowering the height of the vehicle, the discharge valve 6 is opened and a part of the pressurized air in the air chambers 2 is discharged through the valve 6 to the atmosphere.

In order to prevent the pressurized air in air chambers 2 from reversely flowing into the compressor 3, there is provided a check valve or a reverse flow preventing valve 7 in the piping 4.

The adjusters 1, the air compressor 3, the piping 4, the dehumidifying device 5, the discharge valve 6, and the check valve 7 together with a relay switch 10 for operating the air compressor 3 constitute a height adjusting system 20 according to the invention.

The height adjusting system 20 is actuated by an output signal R of comparator means 9 according to the invention which will hereinafter be explained. For elevating the height of the vehicle, the output signal R acting as an air supplying signal is transmitted to the relay switch 10 to turn on the switch thereby operating the air compressor 3. For lowering the height, the output signal R acts as a discharge signal to open the discharge valve 6 which is preferably an electromagntically actuated valve.

To detect the height of the vehicle, there is provided a height detecting means 13 according to the invention. The detecting means 13 comprises a cylindrical rotatable member 14 rotatably mounted on a body 8 of the vehicle and connected with a wheel shaft 11 through a link mechanism 12. The rotatable member 14 rotates in the direction of arrow A as viewed in FIG. 2 when the height of the vehicle decreases, and in the direction of arrow B when the height of the vehicle increases. There are provided on the circumference of the rotatable member 14 three light transparent portions $T_1$, $T_2$ and $T_3$ and three light intercepting portions $V_1$, $V_2$ and $V_3$ for cooperating three photoelectric detectors $S_1$, $S_2$ and $S_3$ which are spaced from one another in the circumferential direction with respect to the rotatable member 14. The photoelectric detectors $S_1$, $S_2$ and $S_3$ are mounted on the body 8 of the vehicle and comprise respectively light emitting members $E_1$, $E_2$ and $E_3$ and light receiving members $R_1$, $R_2$ and $R_3$ confronting respectively the respective light emitting members with the respective portions of the circumference of the rotatable member 14 therebetween. The light emitting members $E_1$, $E_2$ and $E_3$ preferably comprise light sources such as light emitting diodes, and the light receiving members $R_1$, $R_2$ and $R_3$ preferably comprise light sensitive photoelectric elements such as photo-transistors. In the drawing, the light emitting members are located radially inwards of the circumference of the rotatable member 14 and the light receiving members are located radially outwards thereof. But the location of these members may be reversed. Alternatively, the light emitting members and the light receiving members may be provided on opposite sides of a disc shaped rotatable member 14.

When one of the transparent portions $T_1$ of the rotatable member 14 is located between the light emitting member $E_1$ and the light receiving member $R_1$ of the photoelectric detector $S_1$, the light emitted from the light emitting member $E_1$ is received by the light receiving member $R_1$, and the light receiving member $R_1$ generates an output signal of logic "1". When any of the light intercepting portions $V_1$, $V_2$ and $V_3$ is located between the light emitting member $E_1$ and the light receiving member $R_1$, the light receiving member $R_1$ does not receive the light emitted from the light emitting member $E_1$ and does not generate the light detecting signal, and, the light receiving member $R_1$ generates an output signal of logic "0".

In response to the rotational position of the rotatable member 14 or to the height of the vehicle, a height signal as shown in Table 1 is generated from the photoelectric detectors $S_1$, $S_2$ and $S_3$.

TABLE 1

| Vehicle Height | | Height Signal P (P') | | |
|---|---|---|---|---|
| | Referential Signal | $S_1$ | $S_2$ | $S_3$ |
| (high) | | | | |
| $H_1$ | | $P_1(P'_1)$ | 0 | 0 | 1 |
| $H_2$ | $Q_1$ | $P_2(P'_2)$ | 0 | 1 | 0 |
| $H_3$ | | $P_3(P'_3)$ | 0 | 1 | 1 |
| $H_4$ | $Q_2$ | $P_4(P'_4)$ | 1 | 0 | 1 |
| $H_5$ | | $P_5(P'_5)$ | 1 | 1 | 0 |
| (Low) | | | | |

Figure 2:
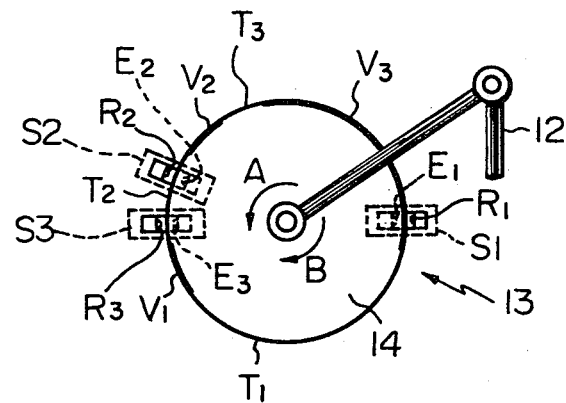
FIG. 2 is a diagrammatic view of detecting means of the vehicle height adjusting apparatus of FIG. 1.

It will be noted that FIG. 2 shows the height condition $H_3$, and when the rotatable member 14 rotates in the direction A, the height condition changes to $H_4$ and then to $H_5$. Further, such logic signals may be determined as desired by changing the link mechanism 12, the relative locations and arrangements of the detectors $S_1$, $S_2$ and $S_3$, and the relative location and arrangement of light transparent portions and light intercepting portions on the circumference of the rotatable member 14. Further, in the embodiment, three photoelectric detectors $S_1$, $S_2$ and $S_3$ are provided for detecting either one of two predetermined reference heights $H_2$ and $H_4$ as described hereinafter in detail, however, three or more reference heights may be detected by increasing the number of the detectors. The photoelectric detectors may be replaced by magnetic or electric detectors.

According to the invention, there is provided height selecting means 15 including a selector switch 16 selecting and designating either of two reference heights $H_2$ and $H_4$, and a height selecting circuit 17 generating a reference signal $Q_1$ or $Q_2$ in response to the selector switch 16. Preferably, the switch 16 is provided on an instrument panel in a driver's compartment and operated by the driver of the vehicle.

Figure 3:
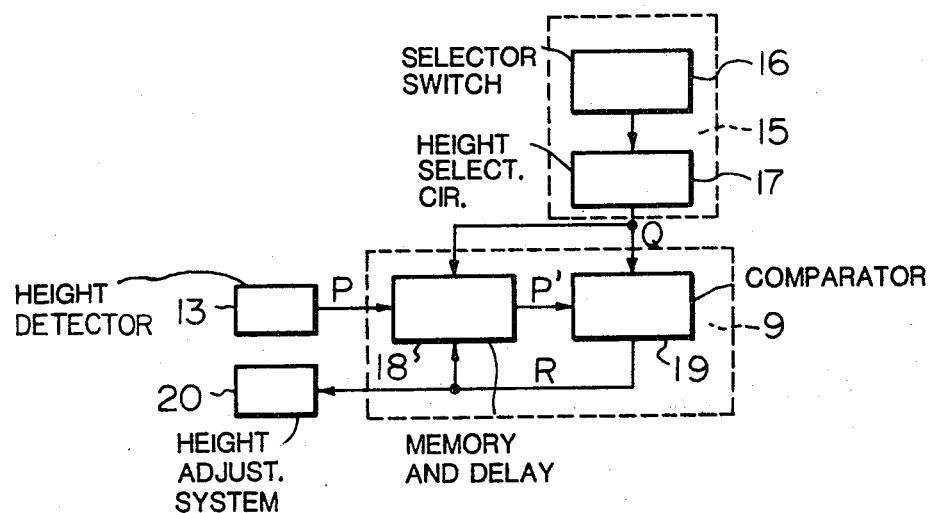
FIG. 3 is a block diagram of the circuit of the apparatus of FIG. 1.

The height signal P and the reference signal Q are supplied to comparator means 9 which comprises a circuit 18 including a memory and a delay circuit (not shown), and a comparator 19 as shown in FIG. 3. The comparator means 9 receives the signal P from the height detecting means 13. When a newly received signal P is equal to a signal which was received a period of time equal to the delay time before the newly received signal, which delay is determined by the delay circuit, the circuit 18 generates an output signal P' which is equal to the input signal P. When the newly received signal P differs greatly from the signal received the delay time before, the circuit 18 generates an output signal P' which is equal to the output signal which was being generated from the circuit 18 immediately before receipt of the greatly differing signal. Thus, the circuit 18 acts as a kind of filtering circuit for eliminating the effects of small vibrations or the like of the vehicle.

Further, the circuit 18 also receives an output signal Q from the circuit 17, and the signal Q is stored in the memory in the circuit 18 by renewing the content of the memory each time. The newly received signal Q is compared with the signal which has been stored in the memory in renewing the content of the memory, and when the newly received signal is not equal to the stored signal e.g. when the reference height signal is changed from $Q_1$ to $Q_2$ or from $Q_2$ to $Q_1$, a flag "1" is established in a flag bit which is provided in a specified location in the memory. When the flag "1" is established in the memory, the output signal P' of the circuit 18 is not controlled by the delay circuit and is equal to the signal received from the height detecting means 13.

The comparator 19 receives the height signal P' from the circuit 18 and the reference height signal Q from the height selecting circuit 17 and compares these two signals and generates an adjusting signal R for actuating the height adjusting system 20. When the content of the height signal P' is lower than the content of the reference height signal Q, the adjusting signal R actuates the switch 10 of the adjusting system 20 to increase the height of the vehicle, and when the content of the height signal P' is higher than the reference height signal Q, the output signal R acts to open the discharge valve 6.

In the embodiment, the signals P, P' and Q correspond respectively to binary numbers of three bits as shown in Table 1, and $P_1$ corresponds to the highest height condition $H_1$, and $P_5$ the lowest $H_5$. A first reference height condition $H_2$ corresponding to the height signals $P'_2$ and $Q_1$ is adapted to operate the vehicle on rough roads, and which is higher than a second reference height $H_4$ corresponding to the height signals $P'_4$ and $Q_2$.

In the embodiment, an intermediate height condition $H_3$ is defined between two reference height conditions $H_2$ and $H_4$, but the intermediate height condition $H_3$ may be omitted. Further, three or more reference height conditions may be provided if desired.

The output signal R of the comparator 19 is also supplied to the circuit 18 and, when the signal R denotes that the signals P' and Q are equal, the flag signal "1" established in the memory is changed to "0". The flag signal "0" denotes that a desired height adjusting operation has been completed. The initial setting of the memory in the circuit 18 is effected at the time of starting of the vehicle.

According to the invention, the driver of the passenger car can easily select a desired height condition among a plurality of reference height conditions in response to the condition of the road on which the vehicle is running, thus, it is possible to decrease the height of the vehicle when running on a paved road thereby increasing the stability of the vehicle and to increase the height of the vehicle in running on a rough road thereby avoiding the bottoming phenomenon.

In the embodiment a combination shock absorber and air spring unit is utilized to adjust the height of the vehicle. However, the shock absorber and the air spring may be provided integrally or separately.

What is claimed is:

1. A vehicle height adjusting device, comprising:
    height detecting means having a rotatable member rotatable in response to the height of a vehicle, at least three photo-electric detectors arranged along the circumference of the rotatable member and spaced from each other, and a number of light intercepting portions equal to the number of photoelectric detectors and being provided on the circumference of the rotatable member and being spaced from each other in the circumferential direction and cooperating with corresponding photo-electric detectors for generating one of at least five possible height signals, said one signal corresponding to the height of the vehicle;
    reference signal means for generating one of at least two reference signals corresponding to a desired height of the vehicle and supplying said one signal as output;

comparator means including a comparator to which said height detecting means and said reference signal means are connected for comparing the height signal with the output of said reference signal means and generating an output signal, and a delay means for delaying the height signal supplied to said comparator, said delay means having actuating means to which said reference signal means is connected for turning the delay means on in response to receipt of a reference signal different from the previous reference signal generated by said reference signal means, and said comparator having the output thereof connected to said actuating means for turning said delay means off when said comparator produces an output indicating that said height signal and said reference signal are equal; and an adjusting system to which said comparator means is connected for receiving the output signal from said comparator and operating to adjust the height of the vehicle.

2. A vehicle height adjusting apparatus as set forth in claim 1 wherein said adjusting system comprises a plurality of combination hydraulic shock absorbers and air springs, a source of pressurized air, and means for supplying and discharging pressurized air into and from the air springs of said combination hydraulic shock absorber and air spring units in response to the output signal of the comparator means.

* * * * *